(12) United States Patent
Park et al.

(10) Patent No.: US 11,628,803 B2
(45) Date of Patent: Apr. 18, 2023

(54) DEVICE AND METHOD FOR CONTROLLING VEHICLE

(71) Applicants: Hyundai Motor Company, Seoul (KR); Kia Motors Corporation, Seoul (KR)

(72) Inventors: Choong Seob Park, Suwon-si (KR); Min Jung Bae, Daegu (KR)

(73) Assignees: Hyundai Motor Company, Seoul (KR); Kia Motors Cornoration, Seoul (KR)

(*) Notice: Subject to any disclaimer, the term of this patent is extended or adjusted under 35 U.S.C. 154(b) by 316 days.

(21) Appl. No.: 16/871,820

(22) Filed: May 11, 2020

(65) Prior Publication Data

US 2021/0179015 A1    Jun. 17, 2021

(30) Foreign Application Priority Data

Dec. 11, 2019 (KR) .......................... 10-2019-0165039

(51) Int. Cl.
| | |
|---|---|
| *E05F 15/00* | (2015.01) |
| *B60R 25/00* | (2013.01) |
| *B60R 25/20* | (2013.01) |
| *B60R 25/01* | (2013.01) |
| *E05F 15/60* | (2015.01) |

(52) U.S. Cl.
CPC ............ *B60R 25/003* (2013.01); *B60R 25/01* (2013.01); *B60R 25/20* (2013.01); *E05F 15/60* (2015.01); *E05Y 2201/434* (2013.01); *E05Y 2400/40* (2013.01); *E05Y 2400/664* (2013.01); *E05Y 2400/85* (2013.01); *E05Y 2900/531* (2013.01); *E05Y 2900/534* (2013.01); *E05Y 2900/548* (2013.01)

(58) Field of Classification Search
CPC ............... E05F 15/60; E05Y 2201/434; E05Y 2400/40; E05Y 2400/664; E05Y 2400/85; E05Y 2900/531; E05Y 2900/534; E05Y 2900/548; B60R 25/003; B60R 25/01; B60R 25/20
USPC .................................................. 49/31; 701/49
See application file for complete search history.

(56) References Cited

U.S. PATENT DOCUMENTS

| | | | | |
|---|---|---|---|---|
| 6,091,162 | A  * | 7/2000 | Williams, Jr | E05F 15/695 340/5.72 |
| 10,479,319 | B1 * | 11/2019 | Wengreen | B60Q 9/00 |
| 10,493,952 | B1 * | 12/2019 | Schwie | B60K 35/00 |
| 10,611,309 | B1 * | 4/2020 | Nagase | B60R 3/02 |
| 2010/0076651 | A1 * | 3/2010 | Nakakura | E05C 17/00 701/49 |
| 2018/0223583 | A1 * | 8/2018 | Podkopayev | F16H 25/20 |
| 2019/0308613 | A1 * | 10/2019 | Lavoie | B60R 25/01 |
| 2020/0141176 | A1 * | 5/2020 | Ichinose | E05C 17/006 |
| 2020/0190889 | A1 * | 6/2020 | Jun | B60K 15/05 |
| 2020/0198581 | A1 * | 6/2020 | Ette | G06N 3/0445 |
| 2021/0179015 | A1 * | 6/2021 | Park | E05F 15/611 |
| 2021/0370866 | A1 * | 12/2021 | Morosawa | B60R 25/31 |

* cited by examiner

*Primary Examiner* — Chi Q Nguyen
(74) *Attorney, Agent, or Firm* — Slater Matsil, LLP

(57) ABSTRACT

A device for controlling a vehicle is provided. The device includes an input device for receiving a user input, a state sensing device for sensing a vehicle state change in response to the user input, and a controller configured to determine whether to apply a driving current of an actuator to a switching device based on the vehicle state change.

19 Claims, 7 Drawing Sheets and stop the driving current of the actuator from being applied at a time of change to stop an operation of the actuator when the vehicle state is changed to correspond to the user input by the driving of the actuator.

DEVICE AND METHOD FOR CONTROLLING VEHICLE

CROSS-REFERENCE TO RELATED APPLICATIONS

This application claims priority to Korean Patent Application No. 10-2019-0165039, filed in the Korean Intellectual Property Office on Dec. 11, 2019, which application is hereby incorporated herein by reference.

TECHNICAL FIELD

The present disclosure relates to a device and a method for controlling a vehicle.

BACKGROUND

Recently, a direct current motor and an actuator that may change a rotational movement to a linear movement are included in a vehicle for opening and closing a door, a trunk lid, and a fuel filler lid. A relay is usually used to control driving of the actuator. The relay is a mechanical switching structure, which has a large package and is only capable of basic on/off control.

A life of the relay is easily deteriorated because of operation noise, electrical noise, and wear caused by mechanical switching during an operation of the relay, and heat is generated because a current application time for driving the actuator may not be able to be changed, thereby making it difficult to control the relay optimally. In addition, when the relay is applied, a passive element for securing a driving current, a fuse for protecting the relay against overvoltage, overcurrent, and high temperature, and the like are additionally required, thereby increasing a volume of the relay.

SUMMARY

The present disclosure has been made to solve problems occurring in the prior art while advantages achieved by the prior art are maintained intact.

An embodiment of the present disclosure provides a device and a method for controlling a vehicle that may solve a heating problem of an actuator and minimize operation noise and electrical noise.

Technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, a device for controlling a vehicle includes an input device for receiving a user input, a state sensing device for sensing a vehicle state changed in response to the user input, and a controller that determines whether to apply a driving current of an actuator to a switching device based on the changed vehicle state.

In one embodiment, the switching device may include a semiconductor element.

In one embodiment, the controller may apply the driving current of the actuator to the switching device in response to the user input, and control to stop the driving current of the actuator from being applied to the switching device according to the vehicle state.

In one embodiment, the controller may start to drive the actuator when the driving current of the actuator is applied to the switching device according to the user input, and stop the driving current of the actuator from being applied at a time of change to stop an operation of the actuator when the vehicle state is changed to correspond to the user input by the driving of the actuator.

In one embodiment, the controller may calculate a maximum driving current of the driving current of the actuator applied to the switching device.

In one embodiment, the controller may calculate the maximum driving current based on a previously stored driving current of the actuator and a previously stored locked rotor current.

In one embodiment, the controller may control the driving current of the actuator applied to the switching device not to exceed the maximum driving current.

In one embodiment, the vehicle state may include at least one of an opening/closing state of a vehicle door, an opening/closing state of a trunk lid, and an opening/closing state of a fuel filler lid.

According to another aspect of the present disclosure, a method for controlling a vehicle includes receiving a user input, sensing a vehicle state change in response to the user input, and determining whether to apply a driving current of an actuator to a switching device based on the changed vehicle state.

In one embodiment, the switching device may include a semiconductor element.

In one embodiment, the determining of whether to apply the driving current of the actuator may include applying the driving current of the actuator to the switching device in response to the user input, and controlling to stop the driving current of the actuator from being applied to the switching device according to the vehicle state.

In one embodiment, the controlling to stop the driving current of the actuator from being applied to the switching device may include starting to drive the actuator when the driving current of the actuator is applied to the switching device according to the user input, and stopping the driving current of the actuator from being applied at a time of change to stop an operation of the actuator when the vehicle state is changed to correspond to the user input by the driving of the actuator.

In one embodiment, the method may further include calculating a maximum driving current of the driving current of the actuator applied to the switching device.

In one embodiment, the calculating of the maximum driving current may include calculating the maximum driving current based on a previously stored driving current of the actuator and a previously stored locked rotor current.

In one embodiment, the applying of the driving current of the actuator to the switching device may include controlling the driving current of the actuator applied to the switching device not to exceed the maximum driving current.

In one embodiment, the vehicle state may include at least one of an opening/closing state of a vehicle door, an opening/closing state of a trunk lid, and an opening/closing state of a fuel filler lid.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
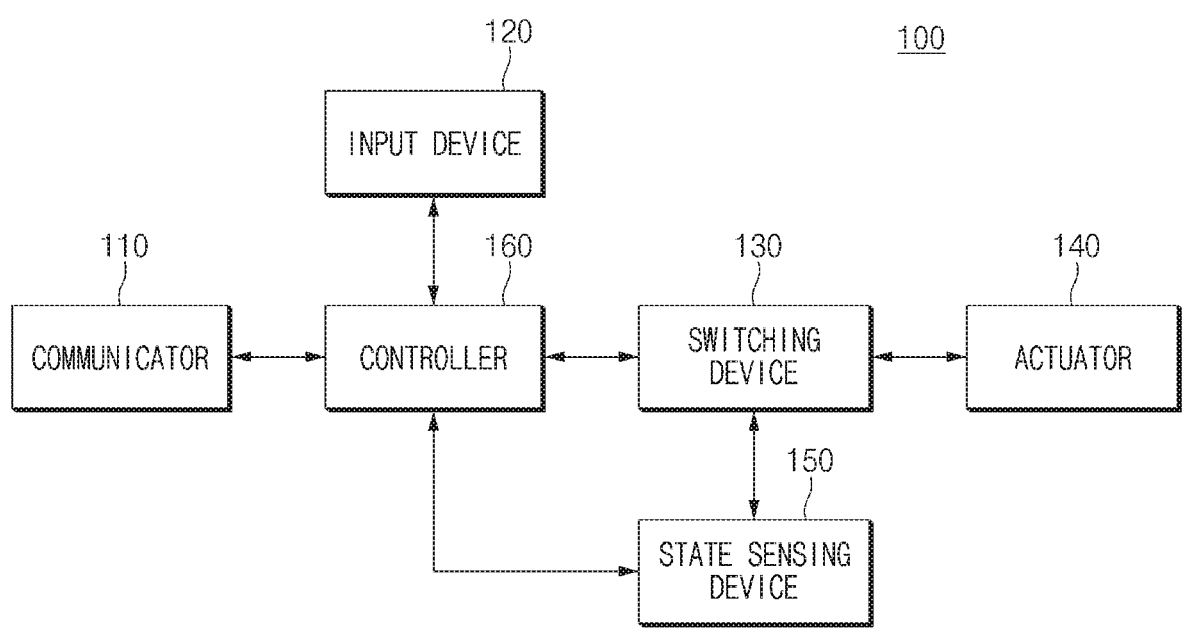
FIG. 1 is a diagram illustrating a configuration of a vehicle control device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a diagram illustrating a configuration of a vehicle control device according to an embodiment of the present disclosure.

As shown in FIG. 1, a vehicle control device 100 of the present disclosure may include a communicator 110, an input device 120, a switching device 130, an actuator 140, a state sensing device 150, and a controller 160.

The communicator 110 may communicate with a starting device (not shown) outside a vehicle. In this connection, the starting device may include a smart key equipped with a FOB, and the like. The communicator 110 may perform a low frequency (LF) communication and a radio frequency (RF) communication with the starting device. Further, when a user inputs an opening/closing of a door, an opening/closing of a trunk lid, or an opening of a fuel filler lid via the smart key, the communicator 110 may receive an input signal from the smart key and transmit the input signal to the controller 160.

The input device 120 may receive, in response to a manipulation, an operation, or a voice of the user, an input signal corresponding to the manipulation, the operation, or the voice of the user. The input device 120 may be embodied as a scroll wheel, a button, a knob, a touch screen, a touch pad, a lever, a track ball, and the like, which may be manipulated by the user, or may be embodied as at least one or combinations of a motion sensor and a voice recognition sensor for respectively sensing an operation and a voice of a passenger.

The switching device 130 may control electrical switching of the actuator 140 in response to a control signal of the controller 160. Further, according to an embodiment, a semiconductor device may be applied as the switching device 130. For example, a MOSFET may be applied as the switching device 130. The MOSFET is the most common field effect transistor (FET) in digital and analog circuits, and is composed of a channel of an N-type semiconductor material or a P-type semiconductor material. Depending on such material, the MOSFET may be divided into an NMOSFET and a PMOSFET. CMOS (complementary MOS) technology includes both NMOSFETs and PMOSFETs. The MOSFET may include terminals of a gate, a source, and a drain. The switching device 130 may allow or stop applying of a current to the actuator 140 depending on an electrical signal output from the state sensing device 150.

The actuator 140 may refer to an apparatus for converting the electrical signal into a physical movement (a rotational movement). According to an embodiment, the actuator 140 may include a motor, and may further include a screw, a nut, and the like for changing a rotational movement of the motor to a linear movement.

The state sensing device 150 may sense an opening/closing state of the vehicle door, an opening/closing state of the trunk lid, and an opening/closing state of the fuel filler lid by an operation of the actuator 140. The state sensing device 150 may output electrical signals corresponding to the opening/closing state of the vehicle door, the opening/closing state of the trunk lid, and the opening/closing state of the fuel filler lid, and may transmit the output electrical signals to the controller 160.

The controller 160 may be implemented by various processing devices, such as a microprocessor with a built-in semiconductor chip capable of performing an operation or an execution of various commands, and may control overall operations of the vehicle control device according to an embodiment of the present disclosure. Specifically, the controller 160 may set a time at which a driving current of the actuator 140 is applied based on a vehicle state changed in correspondence to the user input, and may calculate a maximum driving current applied to the actuator 140.

More specifically, the controller 160 may apply the driving current of the actuator 140 to the switching device 130 corresponding to the user input. In this connection, the user input may mean the input signal received by the controller 160 from the input device 120 and the input signal received by the communicator 110 from the starting device. When there is the user input, that is, when the input signals are received from the communicator 110 and the input device 120, the controller 160 may correspondingly apply the driving current of the actuator 140 to the switching device 130.

According to another embodiment, the controller 160 may control to determine whether an error of the vehicle control device has occurred through self-diagnosis when there is the user input, and control to apply the driving current of the actuator 140 to the switching device 130 when the error of the vehicle control device has not occurred. On the other hand, when an error of the vehicle control device has occurred, the controller 160 may control to initialize the vehicle control device.

When the driving current of the actuator 140 is applied to the switching device 130 corresponding to the user input, the controller 160 may control the actuator 140 to start driving. The controller 160 determines whether the actuator 140 starts the driving and whether the state of the vehicle is changed by the driving of the actuator 140.

For example, when it is determined that there is the user input for opening the door, the controller 160 may control to apply the driving current of the actuator 140 for opening the door to the switching device 130, and control to drive the actuator 140 to open the door by the driving current of the actuator 140 applied to the switching device 130. In addition, when the vehicle door is opened by the driving of the actuator 140 and when an electrical signal corresponding to the opening of the door of the vehicle is received from the state sensing device 150, the controller 160 may determine that the state of the vehicle is changed to correspond to the user input.

When it is determined that the state of the vehicle is changed to correspond to the user input, the controller 160 may control to stop the driving current of the actuator 140 from being applied to the switching device 130 because the driving current of the actuator 140 no longer needs to be applied to the switching device 130, thereby stopping the operation of the actuator 140. That is, when it is determined that the state of the vehicle is changed to correspond to the user input, the controller 160 may prevent the actuator 140 from operating anymore from a time of the change, so that unnecessary current may be prevented from being supplied continuously and heat generation may be prevented. Further, when it is determined that the vehicle state is changed, the controller 160 prevents the actuator 140 from operating to prevent overcurrent inside the actuator 140, so that an operation of a negative temperature coefficient of resistance (NTC) may be delayed to solve a problem of limitation of the number of times of continuous operations.

In addition, the controller 160 may calculate a maximum driving current applied to the switching device 130 and control the driving current applied to the switching device 130 not to exceed the maximum driving current when applying the driving current of the actuator 140 to the switching device 130. In this connection, the controller 160 may calculate the maximum driving current based on a previously stored driving current of the actuator and a previously stored locked rotor current. According to an embodiment, the controller 160 may calculate the maximum driving current by multiplying a variable by a sum of the previously stored driving current and the previously stored locked rotor current. In this connection, the variable may be 0.5, and the previously stored driving current and the previously stored locked rotor current may mean a driving current when the switching device 130 is implemented as a relay. In this connection, the locked rotor current may refer to a current generated by mechanical restraint inside a motor when a motor position changes (LOCK→UNLOCK).

In one example, the maximum driving current may be calculated as different values when the switching device 130 is implemented as the relay and when the switching device 130 is implemented as the semiconductor. Therefore, the above two cases may be compared with each other, and a driving condition of the actuator 140 may be set based on the comparison result. Hereinafter, for convenience of description, the maximum driving current calculated when the switching device 130 is implemented as the relay will be referred to as a previously calculated maximum driving current, and the maximum driving current calculated when the switching device 130 is implemented as the semiconductor will be referred to as a newly calculated maximum driving current.

More specifically, the controller 160 may select whether to set application of the current to the switching device 130 so as not to exceed the previously calculated maximum driving current as the driving condition of the actuator 140, and may select whether to set application of the current to the switching device 130 so as not to exceed the newly calculated maximum driving current as the driving condition of the actuator 140. When the previously calculated maximum driving current is less than the newly calculated maximum driving current, the controller 160 may set the application of the current to the switching device 130 so as not to exceed the newly calculated maximum driving current as the driving condition of the actuator 140. Further, when the previously calculated maximum driving current is equal to or greater than the newly calculated maximum driving current, the controller 160 may set the application of the current to the switching device 130 so as not to exceed the previously calculated maximum driving current as the driving condition of the actuator 140. In addition, the controller 160 may control the current to be applied to the switching device 130 so as not to exceed the maximum driving current set as described above.

Figure 2:
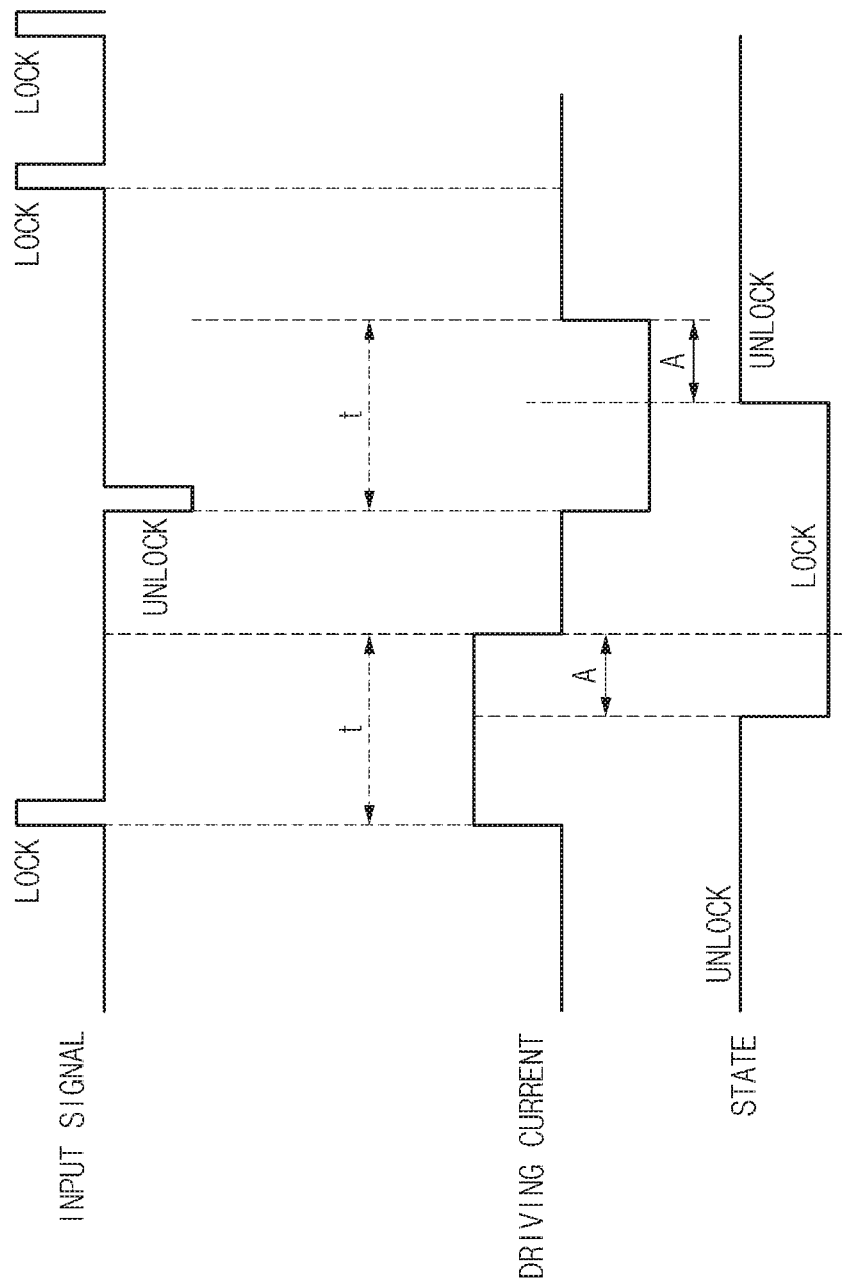
FIG. 2 is a view schematically illustrating an operation of a general vehicle control device.

FIG. 2 is a view schematically illustrating an operation of a general actuator control device.

As shown in FIG. 2, the general actuator control device may mean the case in which the switching device is implemented as the relay. A controller of the general actuator control device may receive the input signals received by the communicator from the starting device or the input signal received from the input device. For example, when receiving an input signal (LOCK) corresponding to door lock, the controller may control to apply the driving current of the actuator for locking the door to the switching device. That is, the controller may control the driving current to be applied to the switching device at a time when the input signal (LOCK) is received. In this connection, the switching device may be implemented as the relay, and the controller may control the driving current to be applied to the switching device for a predetermined time 't' preset for driving the actuator 140. Thus, the controller may allow the actuator to be driven by the driving current applied to the switching device, and may change the state (e.g., the door state) from the UNLOCK to the LOCK by the driving of the actuator. However, because the general actuator control device does not control the driving current applied to the switching device based on the door state, even after the door state is changed from the UNLOCK to the LOCK, the driving current is applied to the switching device for an 'A' time unnecessarily. Therefore, the overcurrent may be induced inside the actuator, and an operating time of the negative temperature coefficient of resistance (NTC) may be moved forward, thereby limiting the number of times of the continuous operations.

Figure 3:
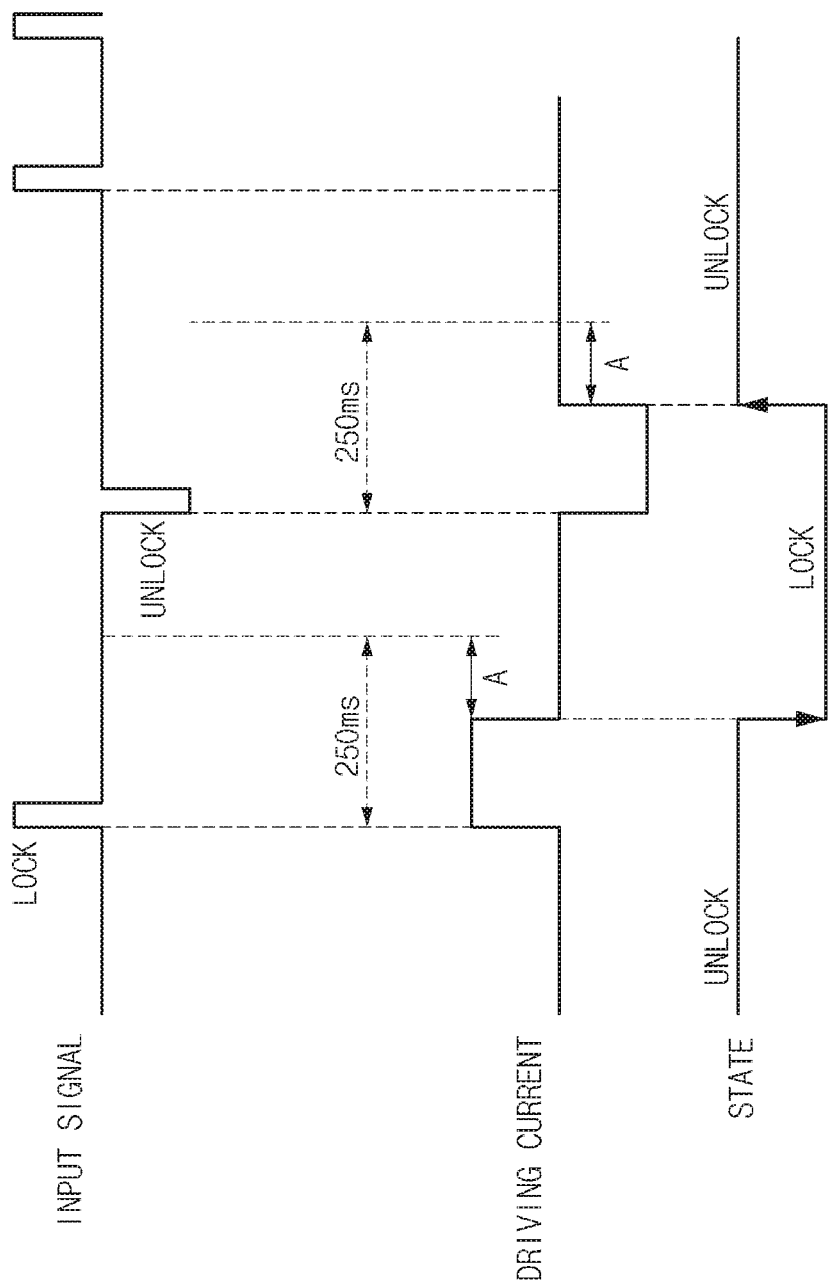
FIG. 3 is a view schematically illustrating an operation of a vehicle control device according to an embodiment of the present disclosure.

FIG. 3 is a view schematically illustrating an operation of an actuator according to an embodiment of the present disclosure.

As shown in FIG. 3, the vehicle control device too of embodiments of the present disclosure may refer to the case in which the switching device 130 is implemented as the semiconductor. The controller 160 of the vehicle control device too of embodiments of the present disclosure may receive the input signal received by the communicator from the starting device or from the input device. For example, when receiving the input signal (LOCK) corresponding to the door lock, the controller 160 may control to apply the driving current of the actuator for locking the door to the switching device. That is, the controller 160 may control the driving current to be applied to the switching device at the time when the input signal (LOCK) is received. In this connection, the switching device 130 may be implemented as the semiconductor, and the controller may control the driving current to be applied to the switching device 130 for the predetermined time 't' preset for driving the actuator 140. Thus, the controller 160 may allow the actuator to be driven by the driving current applied to the switching device 130, and may change the state (e.g., the door state) from the UNLOCK to the LOCK by the driving of the actuator. The controller 160 according to an embodiment of the present disclosure may control the driving current applied to the switching device 130 based on the door state sensed by the state sensing device 150 to stop the application of the driving current at a time when the door state is changed to the LOCK when the door state is already changed from the UNLOCK to the LOCK. Therefore, the general actuator control device may not allow the driving current to be applied to the switching device 130 for the 'A' time unnecessarily to prevent the overcurrent from flowing inside the actuator. Thus, the controller 160 may minimize the heat generation, keep an entry time of a negative temperature coefficient of resistance (NTC) protection element at maximum to increase the number of repeated operations of the motor, and minimize a motor operation noise.

Figure 4:
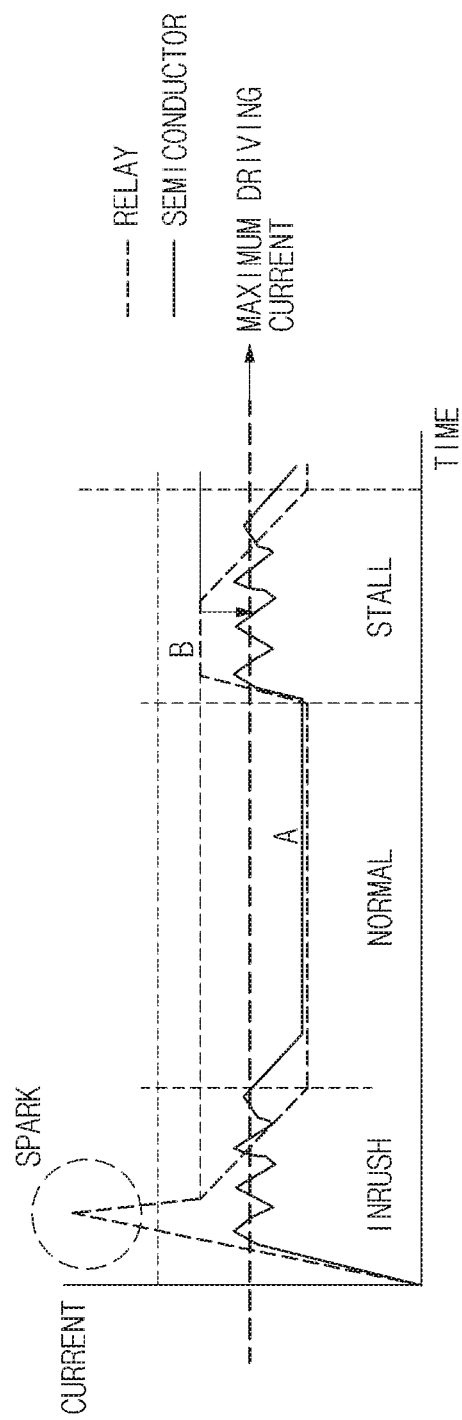
FIG. 4 is a graph illustrating a current applied to an actuator.

FIG. 4 is a graph illustrating a current applied to an actuator.

As shown in FIG. 4, when applying the driving current of the actuator 140 to the switching device 130, the controller 160 may calculate the maximum driving current applied to the switching device 130 and control the driving current applied to the switching device 130 not to exceed the maximum driving current.

The controller 160 may calculate the maximum driving current based on a previously stored driving current 'B' of the actuator and a previously stored locked rotor current 'A'. According to an embodiment, the controller 160 may calculate the maximum driving current by multiplying a variable by a sum of the previously stored driving current 'B' and the previously stored locked rotor current 'A'. In this connection, the variable may be 0.5, and the previously stored driving current and the previously stored locked rotor current may mean the driving current when the switching device 130 is implemented as the relay. Therefore, when applying the driving current of the actuator 140 to the switching device 130, the controller 160 may apply a current that does not exceed the maximum driving current to the switching device 130 using a semiconductor characteristic to switch the switching device 130 and to prevent the heat generation of the semiconductor.

Figure 5:
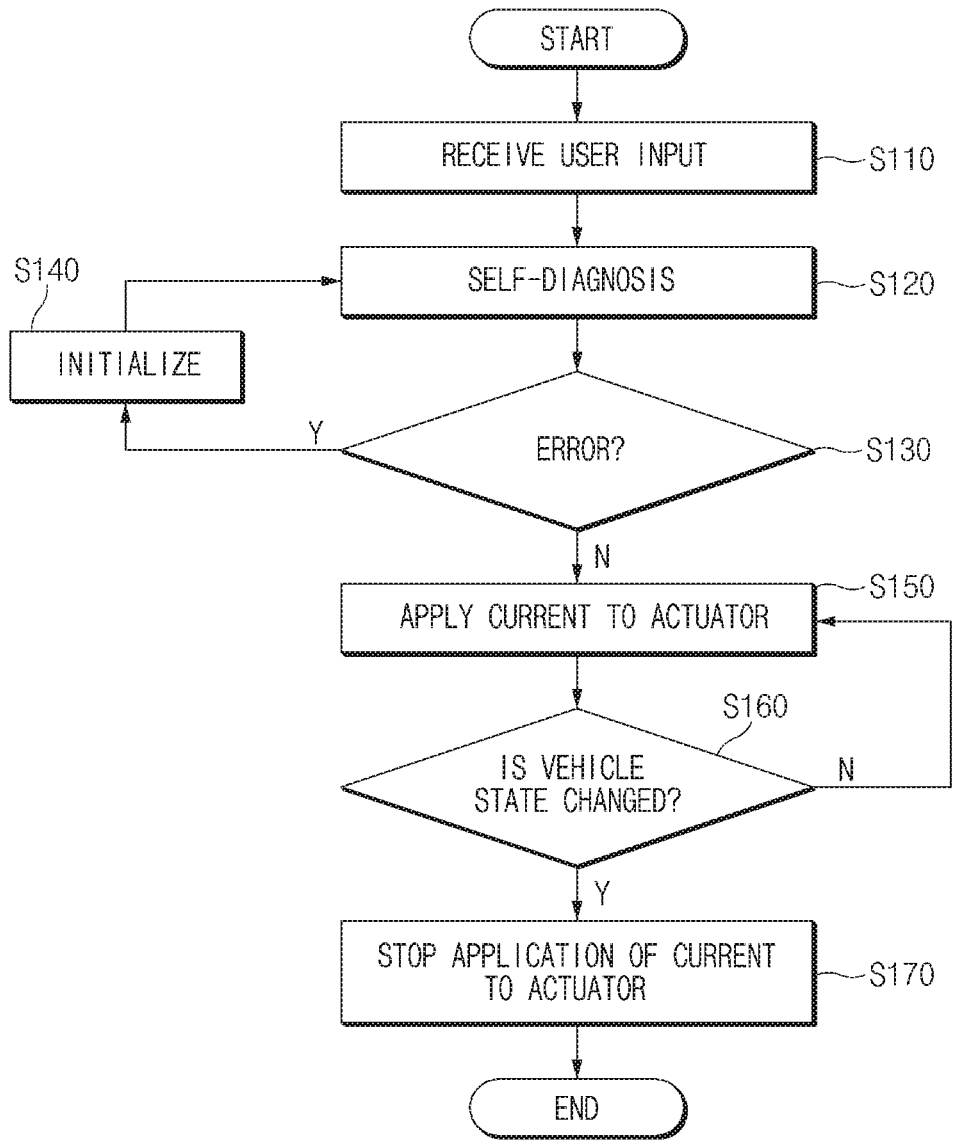
FIG. 5 is a flowchart illustrating a vehicle control method according to an embodiment of the present disclosure.

FIG. 5 is a flowchart illustrating a vehicle control method according to an embodiment of the present disclosure.

As shown in FIG. 5, the controller 160 may set the time at which the driving current of the actuator 140 is applied based on the vehicle state corresponding to the user input, and calculate the maximum driving current applied to the actuator 140 (S110).

The controller 160 performs the self-diagnosis (S120). The controller 160 performs the self-diagnosis in 'S120' to determine whether there is an error in the actuator control device. The controller 160 determines whether the error has occurred after the self-diagnosis (S130). When it is determined in 'S130' that the error has occurred Y, the controller 160 initializes (S140). In addition, when it is determined in 'S130' that the error has not occurred N, the controller 160 allows the current to be applied to the actuator in response to the user input (S150). In S150, the controller 160 may apply the current to the switching device 130 to allow the actuator 140 to operate.

The controller 160 determines whether the vehicle state is changed by the operation of the actuator 140 (S160). In S160, the controller 160 may sense the opening/closing state of the vehicle door, the opening/closing state of the trunk lid, and the opening/closing state of the fuel filler lid from the operation of the actuator 140. That is, the controller 160 may determine whether the state of the vehicle is changed to correspond to the user input. As an example, when it is determined that the user inputs door OPEN, the controller 160 may determine whether the vehicle state is the door OPEN state based on the user input in 'S160'.

When it is determined in 'S160' that the vehicle state is changed by the operation of the actuator 140 (Y), the controller 160 stops the application of the current to the switching device 130 such that the actuator 140 no longer operates (S170). That is, when it is determined that the vehicle state is changed to correspond to the user input, the controller 160 of the present disclosure may control to stop the application of the driving current of the actuator 140 to the switching device 130 such that the actuator 140 no longer operates from the time of change. Thus, the overcurrent inside the actuator 140 may be prevented, so that the operation of the negative temperature coefficient of resistance (NTC) may be delayed to solve the problem of the limitation of the number of times of the continuous operations. On the other hand, when it is determined in 'S160' that the vehicle state is not changed by the operation of the actuator 140, the controller 160 performs 'S150'.

Figure 6:
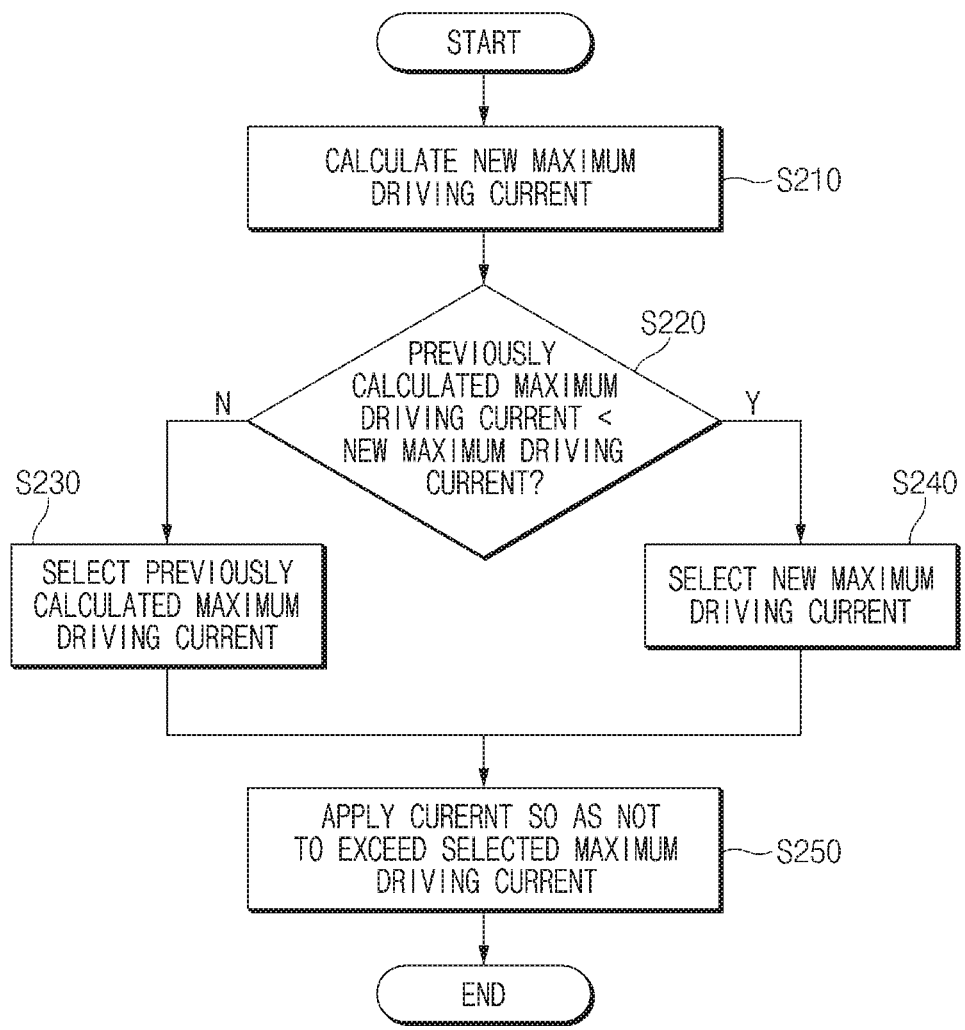
FIG. 6 is a flowchart illustrating a method for setting a current applied to an actuator according to an embodiment of the present disclosure.

FIG. 6 is a flowchart illustrating a method for setting a current applied to an actuator according to an embodiment of the present disclosure.

As shown in FIG. 6, the controller 160 may calculate the maximum driving current based on the previously stored driving current of the actuator and the previously stored locked rotor current of the actuator (S210). In S210, the controller 160 may calculate the maximum driving current by multiplying the variable by the sum of the previously stored driving current and the previously stored locked rotor current. In this connection, the variable may be 0.5, and the previously stored driving current and the previously stored locked rotor current may mean the driving current when the switching device 130 is implemented as the relay. In this connection, the locked rotor current may refer to the current generated by the mechanical restraint inside the motor when the motor position changes (LOCK→UNLOCK).

The controller 160 compares the previously calculated maximum driving current and the newly calculated maximum driving current, and determines whether the previously calculated maximum driving current is less than the newly calculated maximum driving current (S220). The controller 160 may perform 'S220' to set a condition under which the current is applied to the switching device 130 when the actuator 140 is driven.

When the previously calculated maximum driving current is less than the newly calculated maximum driving current (Y) in 'S220', the controller 160 may select the application of the current to the switching device 130 so as not to exceed the newly calculated maximum driving current as the driving condition of the actuator 140 (S240). On the other hand, when the previously calculated maximum driving current is equal to or greater than the newly calculated maximum driving current (N) in 'S220', the controller 160 may select the application of the current to the switching device 130 so as not to exceed the previously calculated maximum driving current as the driving condition of the actuator 140 (S230). In addition, the controller 160 may control the current to be applied to the switching device 130 so as not to exceed the maximum driving current selected in 'S230' or 'S240' (S250).

Figure 7:
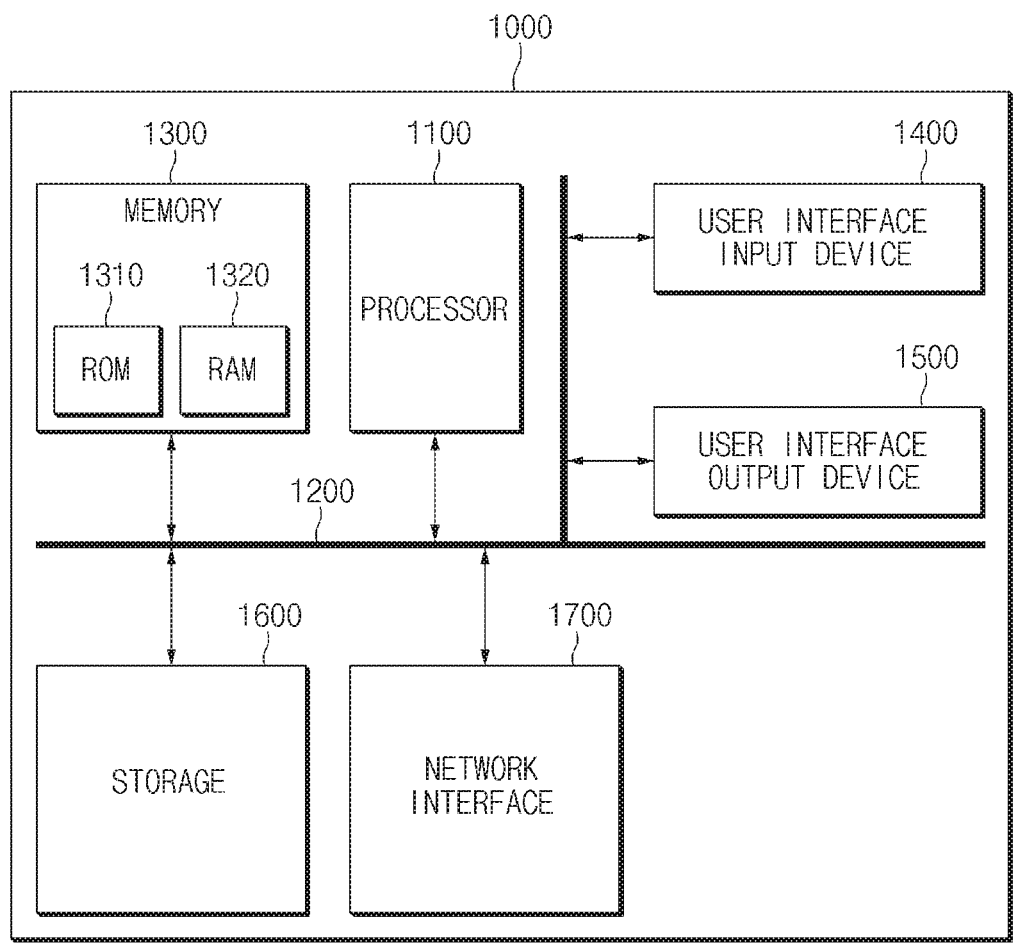
FIG. 7 illustrates a computing system in which a method according to an embodiment of the present disclosure is implemented.

FIG. 7 illustrates a computing system in which a method according to an embodiment of the present disclosure is implemented.

With reference to FIG. 7, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in a hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for controlling the vehicle according to an embodiment of the present disclosure may solve the heating problem of the actuator and minimize the operation noise and the electrical noise.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a vehicle, the device comprising:
   an input device to receive a user input;
   a state sensing device to sense a vehicle state change in response to the user input; and
   a controller configured to determine whether to apply a driving current of an actuator to a switching device based on the vehicle state change, wherein the controller is configured to start to drive the actuator by applying the driving to the switching device according to the user input and to stop the driving current of the actuator from being applied at a time of change to stop an operation of the actuator after determining that the vehicle state is changed to correspond to the user input by the driving of the actuator.

2. The device of claim 1, wherein the switching device comprises a semiconductor element.

3. The device of claim 2, wherein the controller is configured to:
   apply the driving current of the actuator to the switching device in response to the user input; and
   control to stop the driving current of the actuator from being applied to the switching device according to the vehicle state.

4. The device of claim 3, wherein the controller is configured to:
   determine whether start to drive the actuator based on whether the driving current of the actuator is applied to the switching device according to the user input; and
   determine whether to stop the driving current of the actuator from being applied at a time of change to stop an operation of the actuator based on whether the vehicle state is changed to correspond to the user input by the driving of the actuator.

5. The device of claim 3, wherein the controller is configured to calculate a maximum driving current of the driving current of the actuator applied to the switching device.

6. The device of claim 5, wherein the controller is configured to calculate the maximum driving current based on a previously stored driving current of the actuator and a previously stored locked rotor current.

7. The device of claim 6, wherein the controller is configured to control the driving current of the actuator applied to the switching device not to exceed the maximum driving current.

8. A device for controlling a vehicle, the device comprising:
   an input device to receive a user input;
   a state sensing device to sense a vehicle state change in response to the user input; and
   a controller configured to determine whether to apply a driving current of an actuator to a switching device based on the vehicle state change;
   wherein the controller is configured to start to drive the actuator by applying the driving to the switching device according to the user input and to stop the driving current of the actuator from being applied at a time of change to stop an operation of the actuator after determining that the vehicle state is changed to correspond to the user input by the driving of the actuator; and
   wherein the vehicle state includes an opening or closing state of a vehicle door, an opening or closing state of a trunk lid, or an opening or closing state of a fuel filler lid.

9. The device of claim 8, wherein the switching device comprises a semiconductor element.

10. The device of claim 9, wherein the controller is configured to:
apply the driving current of the actuator to the switching device in response to the user input; and
control to stop the driving current of the actuator from being applied to the switching device according to the vehicle state.

11. The device of claim 10, wherein the controller is configured to:
determine whether start to drive the actuator based on whether the driving current of the actuator is applied to the switching device according to the user input; and
determine whether to stop the driving current of the actuator from being applied at a time of change to stop an operation of the actuator based on whether the vehicle state is changed to correspond to the user input by the driving of the actuator.

12. The device of claim 11, wherein the controller is configured to calculate a maximum driving current of the driving current of the actuator applied to the switching device.

13. The device of claim 12, wherein the controller is configured to calculate the maximum driving current based on a previously stored driving current of the actuator and a previously stored locked rotor current.

14. The device of claim 13, wherein the controller is configured to control the driving current of the actuator applied to the switching device not to exceed the maximum driving current.

15. A device for controlling a vehicle, the device comprising:
an input device to receive a user input;
a state sensing device to sense a vehicle state change in response to the user input; and
a controller configured to:
determine whether to apply a driving current of an actuator to a switching device based on the vehicle state change;
apply the driving current of the actuator to the switching device in response to the user input to start to drive the actuator according to the user input; and
stop the driving current of the actuator from being applied at a time of change to stop an operation of the actuator after determining that the vehicle state is changed to correspond to the user input by the driving of the actuator.

16. The device of claim 15, wherein the controller is configured to:
determine whether start to drive the actuator based on whether the driving current of the actuator is applied to the switching device according to the user input; and
determine whether to stop the driving current of the actuator from being applied at a time of change to stop an operation of the actuator based on whether the vehicle state is changed to correspond to the user input by the driving of the actuator.

17. The device of claim 15, wherein the controller is configured to calculate a maximum driving current of the driving current of the actuator applied to the switching device.

18. The device of claim 17, wherein the controller is configured to calculate the maximum driving current based on a previously stored driving current of the actuator and a previously stored locked rotor current.

19. The device of claim 18, wherein the controller is configured to control the driving current of the actuator applied to the switching device not to exceed the maximum driving current.

* * * * *

UNITED STATES PATENT AND TRADEMARK OFFICE
CERTIFICATE OF CORRECTION

PATENT NO. : 11,628,803 B2  
APPLICATION NO. : 16/871820  
DATED : April 18, 2023  
INVENTOR(S) : Choong Seob Park et al.

Page 1 of 1

It is certified that error appears in the above-identified patent and that said Letters Patent is hereby corrected as shown below:

On the Title Page

Item (73) Assignees; delete "Kia Motors Cornoration" and insert --Kia Motors Corporation--.

Signed and Sealed this
Twenty-third Day of May, 2023

Katherine Kelly Vidal  
*Director of the United States Patent and Trademark Office*